US012686598B2

(12) United States Patent
Audouin

(10) Patent No.: US 12,686,598 B2
(45) Date of Patent: Jul. 21, 2026

(54) ASSEMBLY FOR DETECTING COLLISION RISKS WHEN MOVING A LOAD AND CORRESPONDING MOVING METHOD

(71) Applicant: FRAMATOME, Courbevoie (FR)

(72) Inventor: Marc Audouin, Lyons (FR)

(73) Assignee: FRAMATOME, Courbevoie (FR)

( * ) Notice: Subject to any disclaimer, the term of this patent is extended or adjusted under 35 U.S.C. 154(b) by 289 days.

(21) Appl. No.: 18/280,467

(22) PCT Filed: Mar. 8, 2022

(86) PCT No.: PCT/EP2022/055871
§ 371 (c)(1),
(2) Date: Sep. 5, 2023

(87) PCT Pub. No.: WO2022/189420
PCT Pub. Date: Sep. 15, 2022

(65) Prior Publication Data
US 2024/0140764 A1      May 2, 2024

(30) Foreign Application Priority Data

Mar. 8, 2021    (FR) ................................ FR 21 02195

(51) Int. Cl.
| | |
|---|---|
| *B66C 15/00* | (2006.01) |
| *B66C 13/46* | (2006.01) |
| *B66C 15/04* | (2006.01) |
| *B66C 15/06* | (2006.01) |
| *G01S 17/08* | (2006.01) |
| *G06T 11/26* | (2026.01) |

(52) U.S. Cl.
CPC ............ *B66C 15/065* (2013.01); *B66C 13/46* (2013.01); *B66C 15/045* (2013.01); *G01S 17/08* (2013.01); *G06T 11/26* (2026.01)

(58) Field of Classification Search
CPC  B66C 1/22; B66C 13/16; B66C 13/22; B66C 13/44; B66C 15/04; B66C 15/065
See application file for complete search history.

(56) References Cited

U.S. PATENT DOCUMENTS

| | | | |
|---|---|---|---|
| 11,565,916 B2* | 1/2023 | Ladra .................... | B66C 19/007 |
| 2015/0268025 A1 | 9/2015 | Huang et al. | |
| 2020/0307965 A1* | 10/2020 | Pinel ....................... | B66C 13/46 |

FOREIGN PATENT DOCUMENTS

| | | | | |
|---|---|---|---|---|
| CN | 206783154 U | 12/2017 | | |
| DE | 102020214291 B3 * | 3/2022 | .......... | B66C 15/045 |
| EP | 2604569 A2 | 6/2013 | | |
| JP | H0625235 U | 4/1994 | | |

(Continued)

OTHER PUBLICATIONS

International Search Report for PCT/EP2022/055871.

(Continued)

*Primary Examiner* — Emmanuel M Marcelo
(74) *Attorney, Agent, or Firm* — Davidson Kappel LLC

(57) ABSTRACT
A method for detecting collision risks when moving a load includes the following steps:
  attaching a plurality of proximity sensors around the lateral surface of the load;
  lifting and moving the load using the lifting and moving equipment;
  transmitting and displaying the signals generated by the proximity sensors on at least one display unit.

10 Claims, 7 Drawing Sheets

(56) References Cited

FOREIGN PATENT DOCUMENTS

| | | | |
|---|---|---|---|
| JP | 2011063358 A | 3/2011 | |
| JP | 2020003266 A | 1/2020 | |
| KR | 102193717 B1 * | 12/2020 | ............. B66C 13/16 |
| WO | WO-2021108703 A1 * | 6/2021 | ............. B66C 13/46 |

OTHER PUBLICATIONS

Chang Wan-Jung et al: "Design and Implementation of Intelligent Tape for Monitoring High-Price and Fragile Cargo Shipments During Transport Procedures", IEEE Sensors Journal, IEEE, USA, vol. 20, No. 23, Jul. 15, 2020, pp. 14521-14533.
International Search Report for FR2102195.

* cited by examiner

ASSEMBLY FOR DETECTING COLLISION RISKS WHEN MOVING A LOAD AND CORRESPONDING MOVING METHOD

The present disclosure relates in general to the handling of loads using lifting and moving equipment.

BACKGROUND

When handling heavy loads using a lifting and moving equipment such as an overhead crane, there is a risk of collision between the load and its surroundings. In the event of collision, the load itself may be damaged. This is particularly problematic when the load is a high-value part, typically one manufactured for a customer.

During the collision, the equipment or structures placed around the load can also be damaged.

To minimize the risk of collision between the load and its environment, it is possible to place operators at different points around the load as it moves, to monitor the absence of contact.

Such an approach entails a significant risk for operators close to the load. Furthermore, in some cases, this approach requires exceptions to the safety rule prohibiting operators from entering the lifting cone.

SUMMARY

In this context, an aim of the present disclosure is to propose a method for moving a load allowing the risk of collision to be reduced while improving operator safety.

To this end, the present disclosure relates according to a first aspect of a method for moving a load having a closed-contour lateral surface, the method comprising the following steps:

attaching a plurality of proximity sensors to the load, the proximity sensors being distributed around the lateral surface;

attaching the load to a load lifting and moving equipment;

lifting the load using the lifting and moving equipment, and moving the load using the lifting and moving equipment from an initial position to a final position with the load suspended from the lifting and moving equipment, each proximity sensor scanning whether an obstacle is in the vicinity of said proximity sensor during the movement of the load and generating a signal indicating whether an obstacle is in the vicinity of said proximity sensor during the movement of the load;

transmitting the signals generated by the proximity sensors to the at least one display unit; and displaying said signals on the at least one display unit.

The proximity sensors distributed around the lateral surface of the load detect obstacles found in the vicinity of the load during its movement. The proximity sensors continuously send out a signal indicating whether an obstacle is nearby. The operators can visualize these signals using a display unit, such as a tablet.

The load and its environment can be monitored to ensure that there is no risk of collision between them, while remaining at a distance from the load.

As the proximity sensors are distributed around the lateral surface of the load, 360° monitoring is possible.

The operators are therefore no longer obliged to approach the load or enter the lifting cone.

Several display units can be used, enabling several people to simultaneously monitor the movement of the load and assess the risk of collision. For example, one of the display units may be entrusted to the operator controlling the lifting and moving equipment, another to the foreman, and one or more others to the operators involved in the load moving operation.

The method can also present one or more of the following characteristics, considered individually or according to any technically possible combination:

the proximity sensors are miniature MEMS-type sensors;

the proximity sensors are attached to a flexible support; the flexible support being arranged around the lateral surface of the load;

the flexible support is a textile or a net;

the said signals are displayed on the at least one display unit by displaying on an electronic screen of the at least one display unit a symbol representing the lateral surface of the load and, for each proximity sensor, a graphic element indicating whether an obstacle is in the vicinity of the said proximity sensor, the graphic element being produced using the signal generated by the said proximity sensor;

the graphic element associated with each proximity sensor is positioned relative to the symbol representing the lateral surface of the load at a position representative of a position of said proximity sensor around the lateral surface;

the flexible support comprises parts of different colors, the graphic elements associated with the proximity sensors located in a given color part being of said color;

in the load lifting and moving step, when an obstacle is located close to one of the proximity sensors, said proximity sensor evaluates a distance between said proximity sensor and the obstacle, and the signal generated by said proximity sensor contains an indication characterizing said distance;

the graphic element associated with said proximity sensor represents said indication characterizing the distance between the proximity sensor and the obstacle.

According to a second aspect, the disclosure relates to an assembly for detecting the risk of collision during the movement of a load having a lateral surface with closed contours, comprising:

a flexible support;

a plurality of proximity sensors attached to the flexible support, each proximity sensor being configured to scan whether an obstacle is in the vicinity of said proximity sensor and to generate a signal indicating whether an obstacle is in the vicinity of said proximity sensor;

fixing the flexible support to the load, in a position such that the proximity sensors are distributed around the lateral surface;

at least one display unit configured to display the signals generated by the proximity sensors;

a transmitter, configured to transmit the signals generated by the proximity sensors to the at least one display unit.

BRIEF SUMMARY OF THE DRAWINGS

Further features and advantages of the present disclosure will become apparent from the detailed description given below, by way of indication and by no means in no way limiting, with reference to the appended figures, among which.

The assembly 1 illustrated in FIGS. 1 to 4 is provided to detect the risk of collision during the movement of a load 3 having a closed-contour lateral surface 5.

The load 3 is of any type: equipment or part of equipment being manufactured, finished equipment, equipment undergoing maintenance, or any other part to be transported by a lifting device.

The lateral surface 5 corresponds to the surface delimiting the load 3 in horizontal planes, that is, perpendicular to the vertical direction.

The load 3 is provided to be moved by lifting and moving equipment 7.

Figure 1:
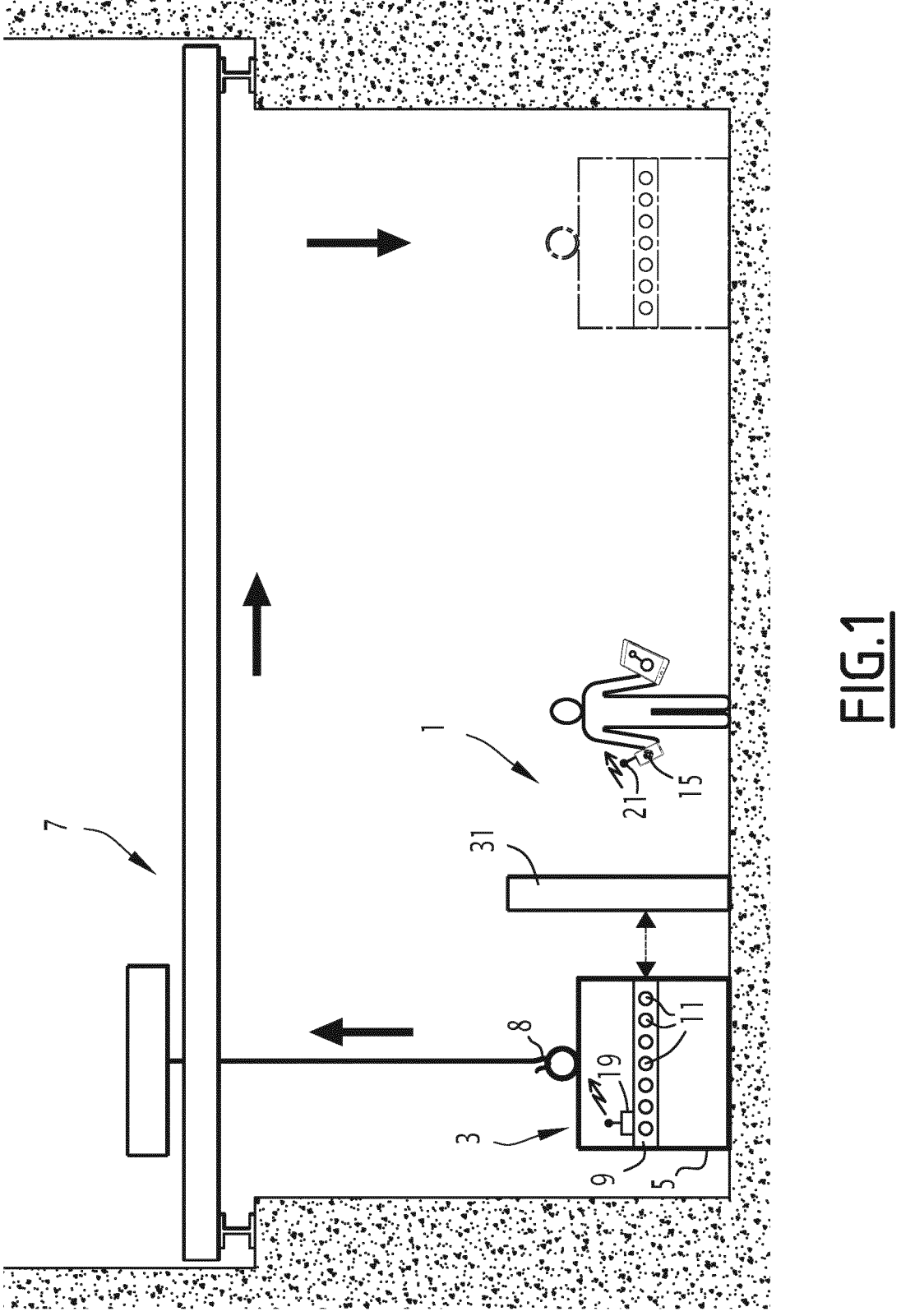
FIG. 1 is a simplified schematic representation of the lifting and moving step of the method of the present disclosure.

In the example shown in FIG. 1, the lifting and moving equipment 7 is an overhead crane. Alternatively, the lifting and moving equipment 7 can be a jib crane, a crane, or any other suitable equipment.

The lifting and moving equipment 7 includes a member 8 for attaching the load 3 to the lifting and moving equipment 7.

This member 8 is, for example, a hook.

The lifting and moving equipment 7 is configured to enable the load 3 to be lifted, in other words, to lift the load 3 above the ground and hold it at a distance above the ground.

The lifting equipment 7 is also provided to move the load 3 from an initial position (shown in solid lines in FIG. 1) to a final position (shown in dashed lines in FIG. 1), while keeping the load 3 suspended from the lifting and moving equipment 7.

Such devices are well known and will not be described here in detail.

The assembly 1 comprises a flexible support 9 and a plurality of proximity sensors 11 attached to the flexible support 9.

The flexible support 9 is typically a textile. A textile is any material made up of interlocking fibers.

This textile is, for example, a woven fabric, in other words, a textile made up of threads arranged in a predetermined regular pattern. The threads are, for example, knitted or woven together.

The yarn is of any suitable type: yarn made of natural material, or plastic, or any other material.

Alternatively, the textile is non-woven or a net or a mesh.

Figure 2:
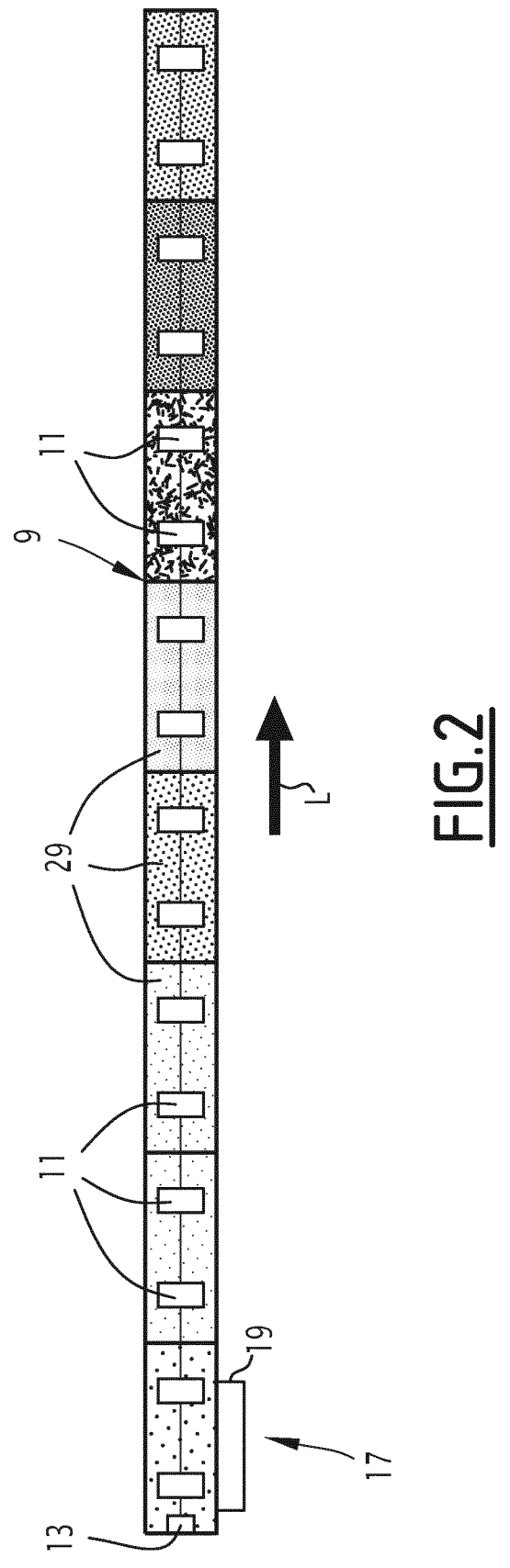
FIG. 2 is a schematic representation of the flexible support carrying the proximity sensors.

Typically, the flexible support 9, when placed flat, presents an elongated shape along a longitudinal direction L displayed in FIG. 2.

In other words, the flexible support 9 presents the shape of a longitudinal strip.

The sensors 11 are distributed longitudinally along the flexible support 9.

They are typically evenly spaced longitudinally along the flexible support 9. For example, they are arranged in a single longitudinal line.

The sensors 11 are distributed along the entire longitudinal length of the flexible support 9.

The longitudinal length of the flexible support 9 corresponds substantially to the perimeter of the lateral surface 5, taken at the height at which the support 9 has to be arranged.

The assembly 1 also includes a system of fasteners 13 for attaching the flexible support 9 to the load 3.

The system of fasteners 13 therefore allows the flexible support 9 to be attached to the load 3, in a stable position.

Figure 3:
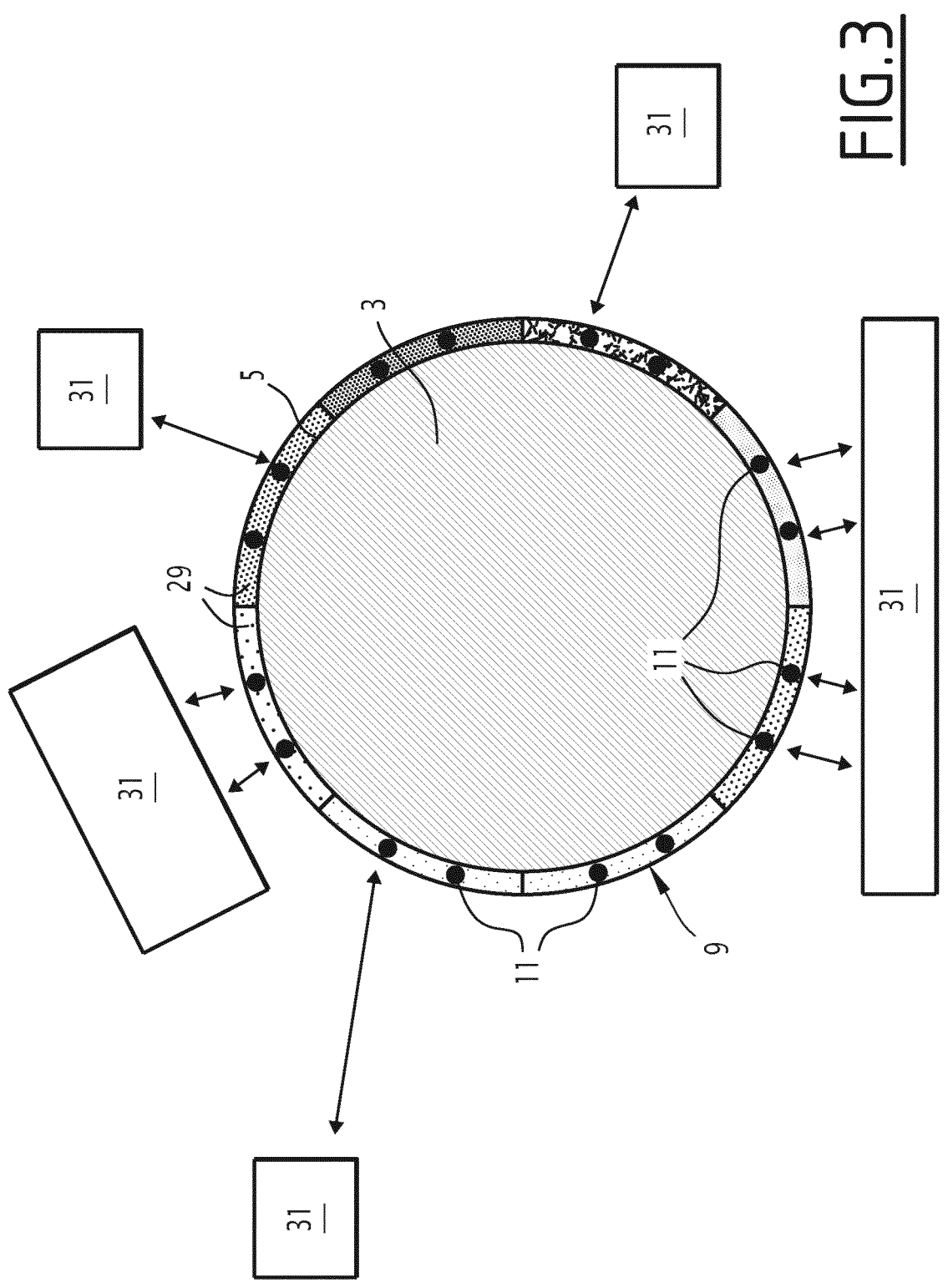
FIG. 3 is a simplified schematic representation of the flexible support of FIG. 2 mounted around the load of FIG. 1, and of various obstacles placed around the load.

In this position, the proximity sensors 11 are distributed around the lateral surface 5, as shown in FIGS. 1 and 3.

The longitudinal spacing between the proximity sensors 11 along the support 9 is chosen so that the detection zones covered by the sensors 11 overlap slightly.

In other words, the proximity sensors 11 are distributed over 360° around the vertical central axis of the load 3. Arranged in this way, the detection fields of the proximity sensors 11 together cover the entire perimeter of the load.

Once in position, the proximity sensors 11 form a line with a closed contour, following the shape of the lateral surface 5 of the load 3.

More precisely, they are arranged on a line having substantially the shape of the horizontal cross-section of the load 3, taken at the height where the sensors 11 are arranged.

Figure 4:
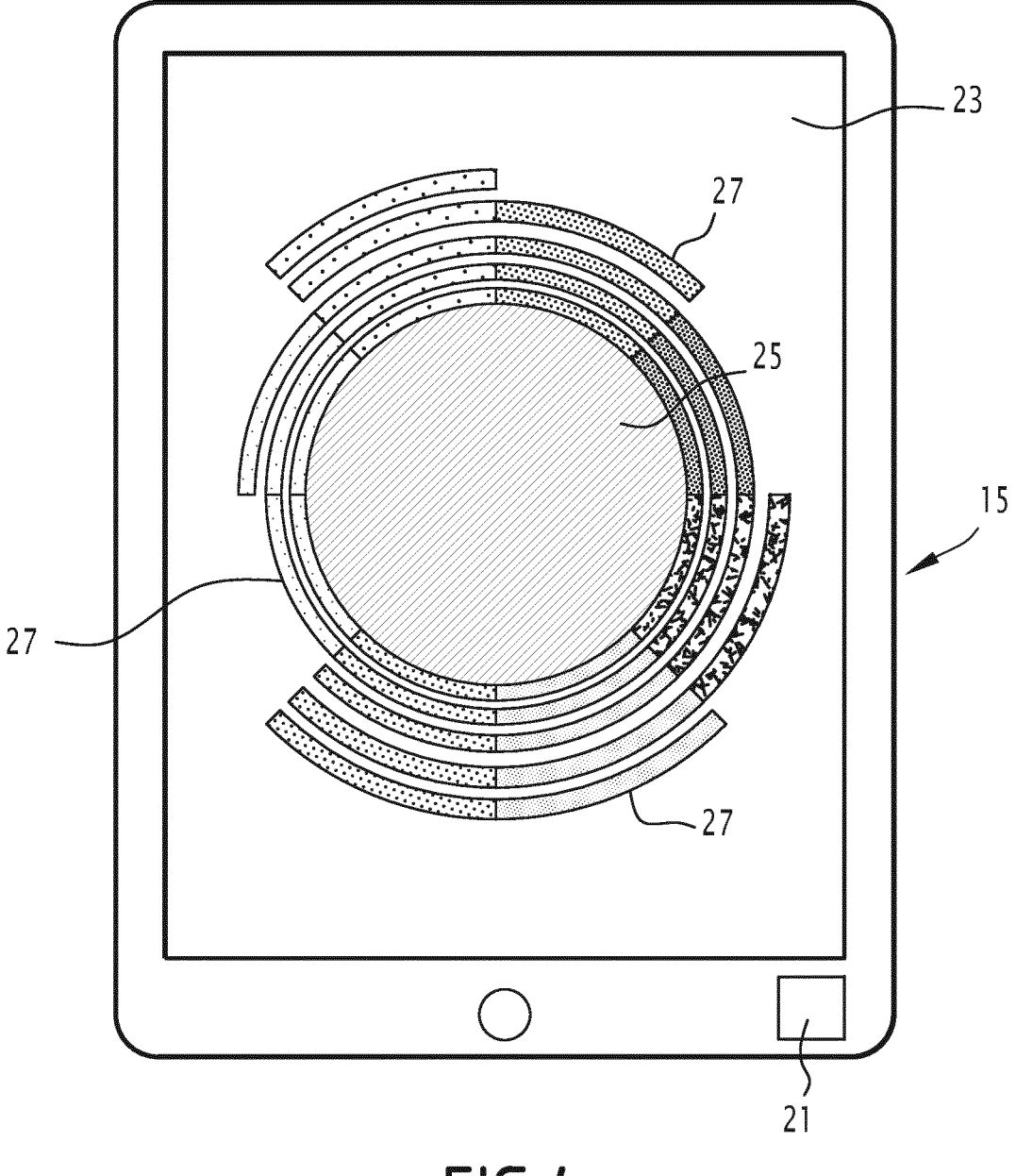
FIG. 4 is a simplified schematic representation of the display unit used in the method of the present disclosure, the screen of this display unit showing the graphic elements generated from the signals transmitted by the proximity sensors in the situation of FIG. 3.

When the load 3 has a circular cross-section, as in the example shown in FIGS. 3 and 4, the line of proximity sensors 11 forms a circle.

Typically, the flexible support 9 forms a strip with a closed contour, following the shape of the lateral surface 5 of the load 3, in other words, having substantially the shape of the horizontal section of the load 3, taken at the height where the flexible support 9 is arranged.

The system of fasteners 13 can be of any suitable type.

For example, when the lateral surface 5 of the load 3 is made of a magnetic material, the system of fasteners 13 comprises a plurality of magnetized elements rigidly attached to the support 9 and distributed longitudinally along the entire length of the support 9.

If the support 9 presents a certain elasticity, the system of fasteners 13 can be provided to reversibly attach one longitudinal end of the support 9 to the opposite longitudinal end. In this way, the support 9 grips the load 3 elastically.

Any other system of fasteners is possible.

The proximity sensors 11 are advantageously miniature MEMS (Micro ElectroMechanical System) type sensors. Such sensors are of reduced size and weight, so that they can easily be integrated into a flexible tissue support or presenting in the form of a net.

The sensors are, for example, infrared sensors or TOF (time of flight) sensors.

These include sensors sold by ST Micro-Electronics in the VL53L range (for example VL53L3CX, VL53L1CX).

Each proximity sensor 11 is configured to scan if an obstacle is in the vicinity of said sensor 11.

Each proximity sensor 11 has a detection zone covering a given angular sector, depending on the type of sensor and the desired accuracy.

The longitudinal spacing between the proximity sensors 11 along the support 9, as indicated above, is chosen so that the detection zones of the sensors overlap slightly.

The maximum detection distance of each proximity sensor 11 is typically between 1 and 5 meters, for example 2 meters.

Each proximity sensor 11 is configured to generate a signal indicating whether an obstacle is in the vicinity of said proximity sensor, and to indicate the distance between the sensor and the obstacle.

"In the vicinity of said proximity sensor" is understood to mean that the obstacle is within the detection zone of the sensor.

The assembly 1 also comprises at least one display unit 15, configured to display the signals generated by the proximity sensors 11.

The display unit 15 is typically a portable electronic device, such as a smartphone, tablet, laptop, etc.

Alternatively, the display unit 15 is a fixed computer.

Furthermore, the assembly 1 includes a transmission device 17, configured to transmit the signals generated by proximity sensors 11 to the at least one display unit 15.

The transmission device 17 typically comprises a transmitter 19 carried by the flexible support 9.

The transmission device 17 also includes, for the or each display unit 15, a receiver 21 configured to communicate with the transmitter 19.

The transmitter 19 communicates with the or each receiver 21 over the air. The transmission uses a Wi-Fi, Bluetooth or Lorawan protocol.

Advantageously, each proximity sensor 11 is connected to the transmitter 19 in a wired manner.

The wires transmitting the signal emitted by each proximity sensor 11 to the transmitter 19 are carried by the flexible support 9.

The or each display unit 15 includes an electronic screen 23.

The or each display unit 15 is configured to display the signals generated by the proximity sensors 11 by displaying on the electronic screen 23 a symbol 25 representing the lateral surface 5 of the load 3 and, for each proximity sensor 11, a graphic element 27 indicating whether an obstacle is in the vicinity of said proximity sensor 11 (FIG. 4).

The graphic element 27 is created using the signal generated by said proximity sensor 11.

Advantageously, the proximity sensor 11 is configured so that, when an obstacle is in the vicinity of said sensor, a distance between said proximity sensor 11 and the obstacle is evaluated.

In this case, the signal generated by the proximity sensor 11 contains an indication characterizing said distance.

The graphic element 27 associated with said proximity sensor then represents said indication characterizing the distance between the proximity sensor 11 and the obstacle.

Typically, the symbol 25 representing the lateral surface 5 of the load 3 is a geometric shape corresponding substantially to the cross-section of the load 3 taken in a horizontal plane substantially at the level where the flexible support 9 is arranged.

The symbol 25 typically corresponds exactly to the horizontal cross-section of the load, particularly when this shape is simple.

In the example shown in FIGS. 3 and 4, load 3 has a circular horizontal cross-section at the level of the flexible support 9, and symbol 25 is a circle.

Figure 5:
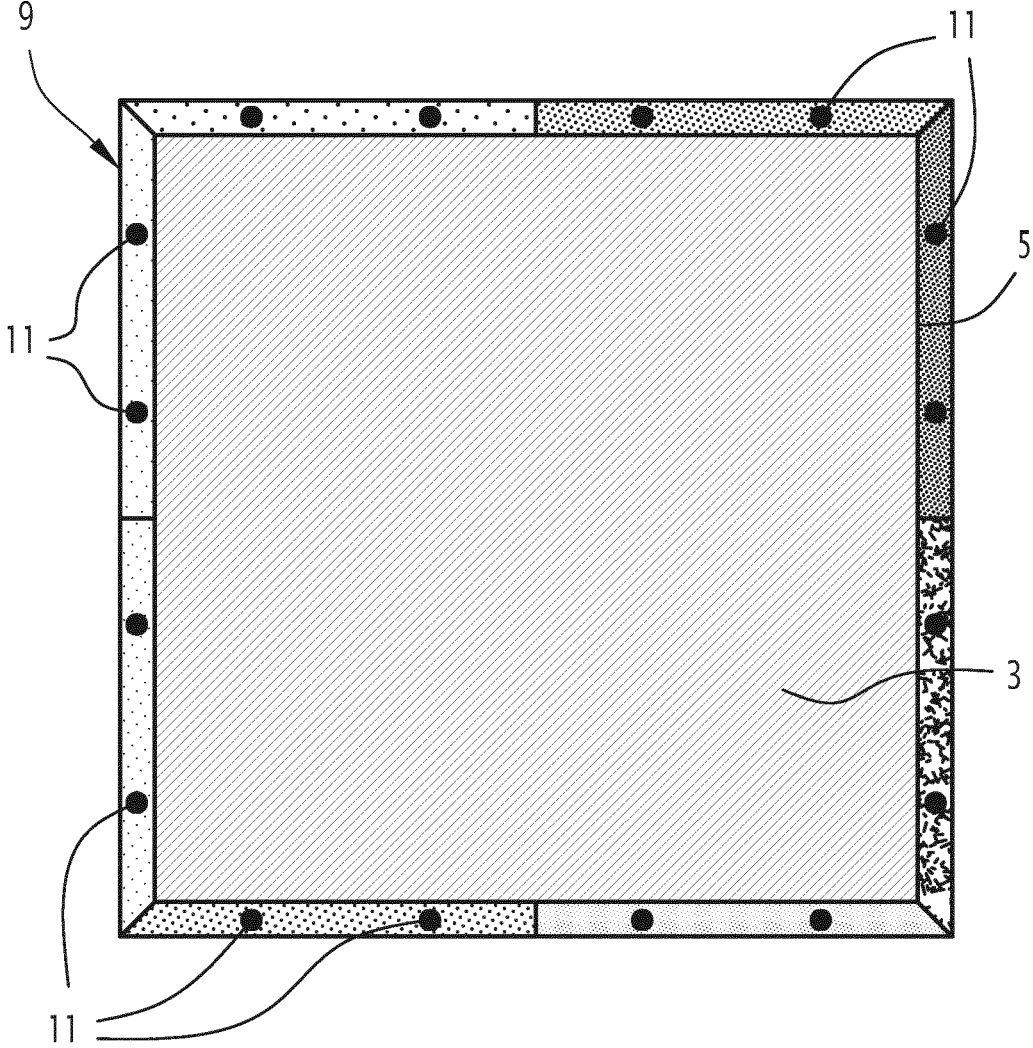
FIG. 5 shows the flexible support of FIG. 2 arranged around a load of a different shape.
Figure 6:
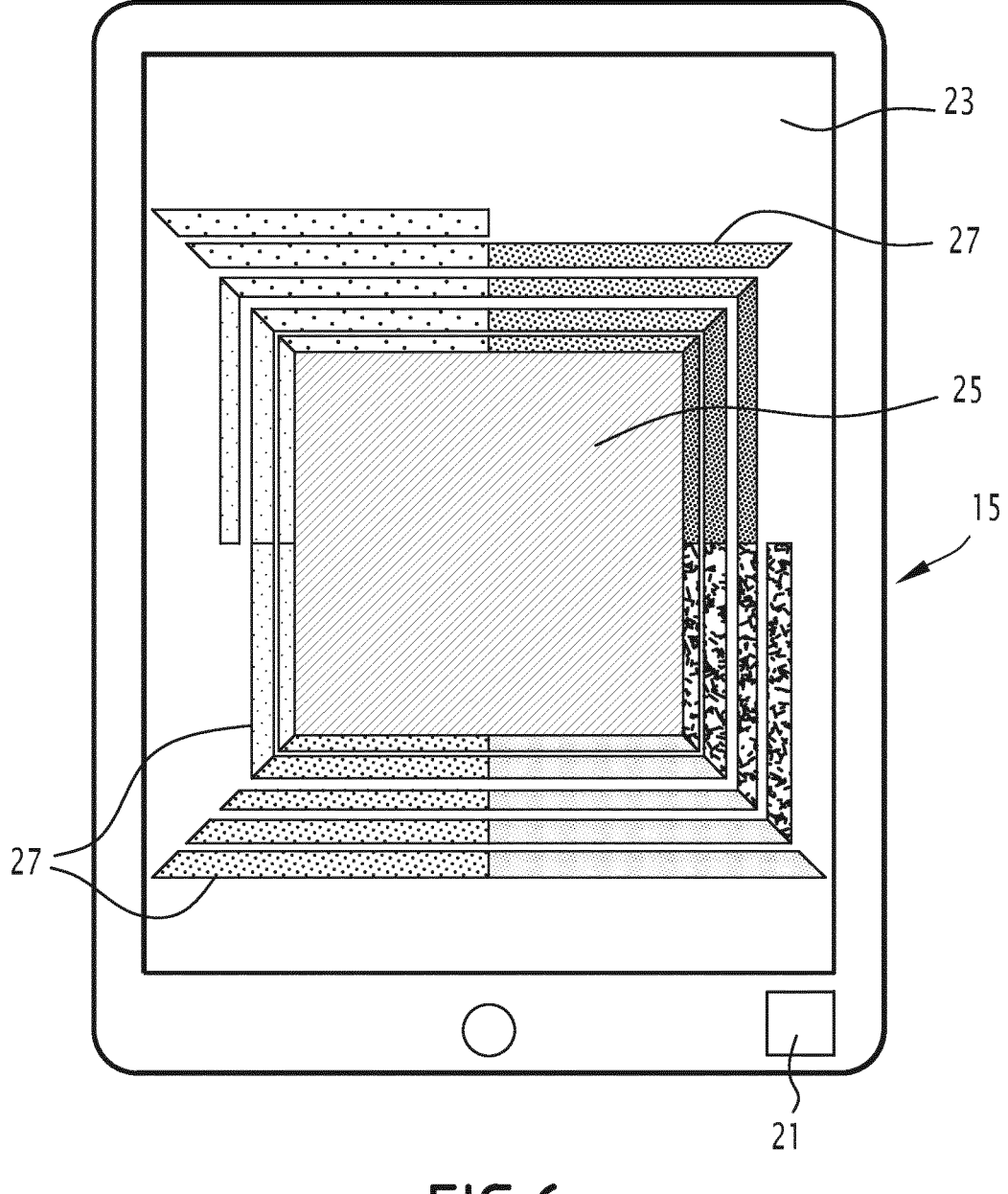
FIG. 6 is a view similar to FIG. 4, for a load of the shape shown in FIG. 5.

In the example shown in FIGS. 5 and 6, the load 3 has a rectangular horizontal cross-section at the level of the flexible support 9. The symbol 25 shown on the display unit 15 is also a rectangle.

The graphic element 27 comprises, for example, one or more bars.

For example, graphic element 27:

has no bars if no obstacle is detected by the proximity sensor 11;

comprises one or more bars when an obstacle is detected by the proximity sensor 11, the number of bars being inversely proportional to the distance between proximity sensor 11 and the obstacle.

As illustrated in FIGS. 4 and 6, the bars are parallel to each other and are stacked starting from the symbol representing the lateral surface of the load.

For example, the sensor range, in other words, the maximum distance at which the sensor can detect an obstacle, is divided into several ranges, and a different number of bars is associated with each range. The range furthest from the sensor is associated with a single bar. The range corresponding to the immediate proximity to the sensor is associated with the maximum number of bars, for example five bars in the example shown.

The intermediate ranges are associated with two bars, three bars or four bars.

The graphic element 27 may not be constituted of bars of the type shown in FIGS. 4 and 6 but may be of any other suitable type.

The signal generated by each proximity sensor 11 contains, for example, a value of the distance measured by the proximity sensor 11 between the sensor 11 and the obstacle. In this case, the or each display unit 15 is configured to determine the number of bars corresponding to each measured distance value. This determination is carried out using a correspondence table or equation.

Alternatively, the signal includes a code capable of adopting several discrete values, each value corresponding to a range of distance between the sensor and the obstacle. In this latter case, the or each display unit 15 is configured to directly associate a number of bars with each code value.

Advantageously, the graphic element 27 associated with each proximity sensor 11 is positioned relative to the symbol 25 representing the lateral surface 5 of the load 3 at a position representative of the position of said proximity sensor 11 around the lateral surface 5.

For example, one of the proximity sensors 11 is considered as an angular position reference. The graphic element 27 associated with this reference proximity sensor is considered as an angular position reference on the electronic screen of display unit 15.

The graphic element 27 associated with another proximity sensor 11 is positioned at a specific angular position around the symbol 25 relative to the reference graphic element. This determined angular position corresponds substantially to the angular position of the other proximity sensor 11 around the side surface 5 relative to the reference proximity sensor 11.

As illustrated in the figures, the flexible support 9 advantageously includes the parts 29 of different colors.

For example, the flexible support 9 is divided into several longitudinally juxtaposed parts 29, each of a different color.

The graphic elements 27 associated with the proximity sensors 11 located in a part 29 of a given color are of said color on the display unit 15.

This thus makes it easy, by looking at the electronic display 23 on the display unit 15, to tell which part of the load 3 is closest to an obstacle.

In the example shown, each part 29 includes two proximity sensors 11.

For example, each graphic element 27 is created using only the signal generated by one of the proximity sensors 11. In this case, it characterizes only the signal generated by said sensor.

Alternatively, each graphic element 27 can be created using the signals generated by several proximity sensors 11 juxtaposed longitudinally along the support 9. For example, each graphic element 27 is created using the signals generated by two proximity sensors 11.

In the example shown, each graphic element 27 is created using the signals generated by the proximity sensors 11 located in the same part 29 of the flexible support 9.

In this case, for example, graphic element 27 is created in the following manner:

if neither of the two proximity sensors 11 detects an obstacle, the graphic symbol 27 corresponds to a signal indicating that there is no obstacle in the vicinity;

if at least one of the two proximity sensors 11 detects an obstacle, the graphic element 27 corresponds to a signal indicating that an obstacle is nearby.

If the signal generated by each proximity sensor contains an indication characterizing the distance between the sensor and the obstacle, the graphic element is created by taking into account the smallest of the distances evaluated by the two proximity sensors.

If one or both proximity sensors do not detect an obstacle, this distance is not taken into account.

The present disclosure also relates to a method for moving a load, which will now be described.

The load 3 is as described above, and presents a closed-contour lateral surface 5.

The method comprises a step of attaching a plurality of proximity sensors 11 to the load 3, the proximity sensors 11 being distributed around the lateral surface 5.

The proximity sensors 11 are of the type described above.

As mentioned above, they are advantageously attached to a flexible support 9, the flexible support 9 being arranged around the lateral surface 5 of the load 3.

The flexible support 9 is of the type described above.

As described above, the proximity sensors 11 are arranged to form at least one closed-contour line around the side surface, located at a given height from the load 3.

The method further includes a step of attaching the load 3 to a load lifting and moving equipment 7.

As mentioned above, this equipment 7 is, for example, an overhead crane, a jib crane, a crane or any other suitable equipment.

The method further includes a step of lifting the load 3 using the lifting and moving equipment 7 (represented by the vertical arrow pointing upwards on the left of FIG. 1) and moving the load 3 using the lifting and moving equipment 7.

This movement is shown by the horizontal arrow in FIG. 1.

The load is moved from an initial position (solid lines on the left of FIG. 1) to a final position (broken lines on the right of FIG. 1) with the load 3 suspended from the lifting and moving equipment 7.

During movement of the load 3, each proximity sensor 11 scans for any obstacle 31 found in the vicinity of said proximity sensor 11. This scanning is carried out continuously, or at extremely short intervals with respect to the time required to lift and move the load 3.

The proximity sensor 11 generates a signal indicating whether an obstacle 31 is in the vicinity of the sensor 11 while the load 3 is being moved. Again, this signal is generated continuously, or with an extremely low periodicity relative to the time required to lift and move the load 3.

The method also includes a step for transmitting the signals generated by the proximity sensors 11 to the at least one display unit 15.

The signal is transmitted as described above.

Each proximity sensor 11 typically transmits the signal by wire to the transmitter 19, which transmits it over the air to the receiver 21 on the or each display unit 15.

The or each display unit 15 is of the type described above. For example, it is a tablet.

The method also includes a step of displaying said signals on the at least one display unit 15.

This display is carried out as described above.

The displacement method and the detection assembly of the present disclosure can have multiple variants.

Figure 7:
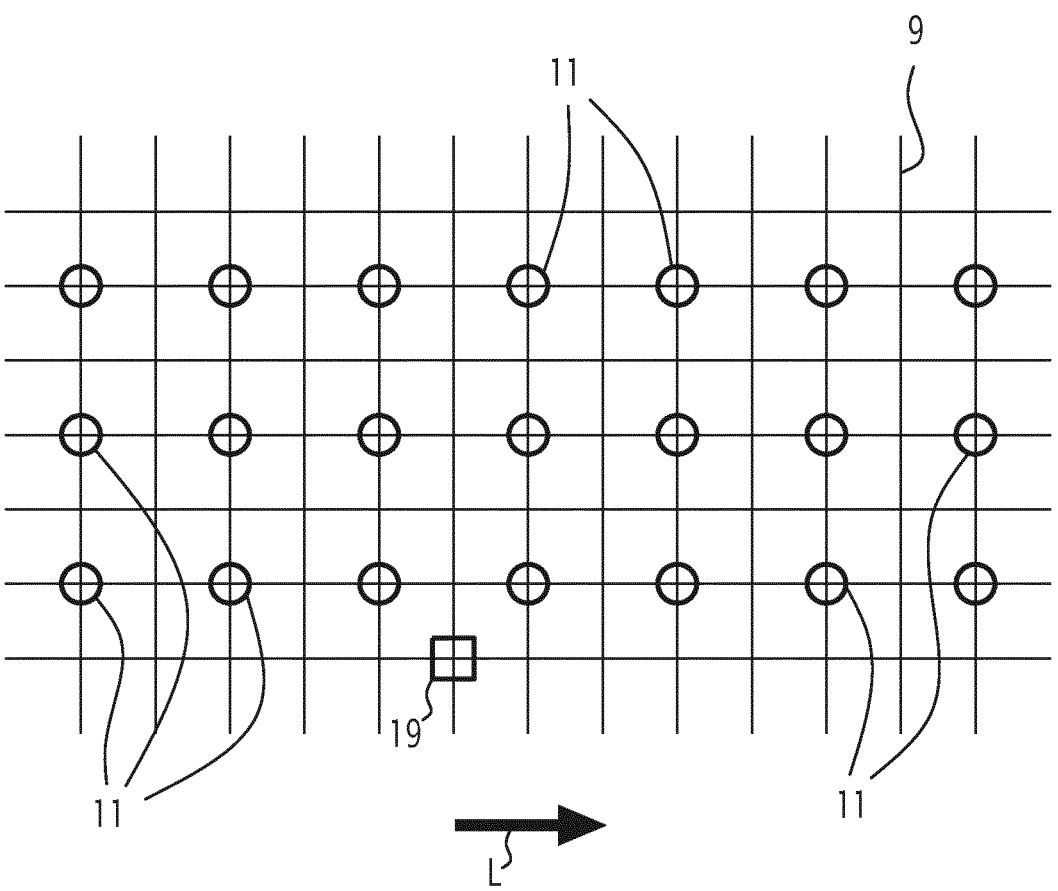
FIG. 7 is a simplified schematic representation of another flexible support, on which proximity sensors are mounted.

According to one alternative illustrated in FIG. 7, the flexible support 9 is not a textile but is a net or a mesh structure. In this case, the proximity sensors 11 are attached to the nodes of the net or mesh.

According to one alternative not shown, the proximity sensors 11 are not attached to a flexible support, but are attached directly to the lateral surface 5 of the load 3. For example, they are attached individually, by magnetic means.

According to another alternative, the proximity sensors 11 are not all attached to a single flexible support. They are distributed over several flexible supports; each flexible support being attached to the load.

According to one alternative illustrated in FIG. 7, the proximity sensors 11 are arranged on the flexible support 9 in several longitudinal lines, parallel to one another.

In this case, the flexible support 9 is very high, and all the proximity sensors 11 are attached to the same flexible support 9.

The proximity sensors 11 form several closed-contour lines around the lateral surface 5, at different heights of the load 3.

Each closed-contour line follows the shape of the lateral surface 5 of the load 3 at the height at which the line is arranged.

This arrangement is particularly advantageous if the load is very high, or if its cross-section varies according to the height.

In this case, the proximity sensors should be arranged around the most protruding parts of the load.

According to another alternative, the proximity sensors are arranged according to a closed contour line, but at different heights of the load. For example, one part of the proximity sensors is arranged relatively lower, and another part of the proximity sensors relatively higher. This is suitable in cases where the horizontal cross-section of the load is irregular, with parts protruding in different directions and located at different heights.

According to one alternative embodiment, the signal generated by each proximity sensor indicates only whether an obstacle is in the vicinity of said proximity sensor 11 and does not contain any indication characterizing the distance between the obstacle and the proximity sensor.

The graphic element 27 is, therefore, of a different type to the graphic elements shown in FIGS. 4 and 6. For example, the graphic element contains a symbol such as a bar when an obstacle is in the vicinity of proximity sensor 11, and shows nothing at all, in other words, zero bars, when no obstacle is detected in the vicinity of the proximity sensor.

The signal generated by the proximity sensor in this case is typically a binary signal capable of adopting two values: one value if an obstacle is detected, and another value if no obstacle is detected in the vicinity of the sensor.

The method of moving and the detection assembly of the present disclosure presents multiple advantages.

Because the proximity sensors are miniature MEMS-type sensors, they present a reduced weight and volume, and can be easily attached to a flexible support.

The fact that the proximity sensors are attached to a flexible support, they can be easily arranged around the lateral surface of the load. The flexible support conforms to the shape of the lateral surface, allowing the sensors to be positioned as close as possible to the lateral surface.

When the flexible support is a textile or a net, the sensors can easily be attached to the support. In addition, the support can be easily attached to the load. It does not add weight or bulk.

The fact that viewing the signals generated by each sensor on at least one display unit, is implemented by displaying on the electronic screen a symbol representing the lateral surface of the load and, for each proximity sensor, a graphic element indicating whether an obstacle is in the vicinity of said proximity sensor, the graphic element being created using the signal generated by said proximity sensor, the operators have a quick and easy view of collision risks.

When the graphic element associated with each proximity sensor is positioned relative to the symbol representing the lateral surface of the load at a position representative of a position of said proximity sensor around the lateral surface, the operators can easily apprehend which zone(s) of the lateral surface is/are close to an obstacle.

The fact that the flexible support comprises parts of different colors, with the graphic elements associated with the proximity sensors located in a given colored part being of said color, allows the operators to apprehend even more easily, which zone of the lateral surface is close to an obstacle.

The fact that each proximity sensor evaluates a distance between said proximity sensor and the obstacle, and that the signal generated by said proximity sensor contains an indication characterizing said distance, further reinforces safety during load movement. The operators are provided with information indicating whether an obstacle is approaching or moving away and allowing them to identify which zone of the lateral surface is closest to an obstacle.

The invention claimed is:

1. A method for moving a load having a closed-contour lateral surface, the method comprising the following steps:
   attaching a plurality of proximity sensors to the load, the proximity sensors being distributed around the lateral surface;
   hooking the load to an equipment for lifting and moving the load;
   lifting the load using the lifting and moving equipment, and moving the load using the lifting and moving equipment from an initial position to a final position with the load suspended from the lifting and moving equipment, each proximity sensor scanning to check whether an obstacle is in the vicinity of said proximity sensor during movement of the load and generating a signal indicating whether an obstacle is in a vicinity of said proximity sensor during movement of the load;
   transmitting the signals generated by the proximity sensors to at least one display unit; and
   displaying said signals on the at least one display unit, wherein the proximity sensors are attached to a flexible support, the flexible support being arranged around the lateral surface of the load.

2. The method according to claim 1, wherein the proximity sensors are MEMS-type miniature sensors.

3. The method according to claim 1, wherein the flexible support is a textile or a net.

4. The method according to claim 1, wherein the display of said signals on the at least one display unit is performed by displaying on an electronic screen of the at least one display unit a symbol representing the lateral surface of the load and, for each proximity sensor, a graphic element indicating whether an obstacles in the vicinity of said proximity sensor, the graphic element being produced using the signal generated by said proximity sensor.

5. The method according to claim 4, wherein the graphic element associated with each proximity sensor is positioned relative to the symbol representing the lateral surface of the load at a position representative of a position of said proximity sensor around the lateral surface.

6. The method according to claim 4, wherein the proximity sensors are attached to a flexible support, the flexible support being arranged around the lateral surface of the load and the flexible support comprises parts of different colors, the graphic elements associated with the proximity sensors located in a part of a given color being of said color.

7. The method according to claim 1, wherein in the step of lifting and moving the load, when an obstacle is in proximity to one of the proximity sensors, said proximity sensor evaluates a distance between said proximity sensor and the obstacle and the signal generated by said proximity sensor contains an indication characterizing said distance.

8. The method according to claim 7, wherein the display of said signals on the at least one display unit is performed by displaying on an electronic screen of the at least one display unit a symbol representing the lateral surface of the load and, for each proximity sensor, a graphic element indicating whether an obstacle is in the vicinity of said proximity sensor, the graphic element being produced using the signal generated by said proximity sensor, the graphic element associated with said proximity sensor represents said indication characterizing the distance between the proximity sensor and the obstacle.

9. An assembly for detecting a risk of collision when moving a load having a lateral surface with a closed contour, the assembly comprising:
   a flexible support;
   a plurality of proximity sensors attached to the flexible support, each proximity sensor being configured to scan whether an obstacle is in a vicinity of said proximity sensor and to generate a signal indicating whether an obstacle is in the vicinity of said proximity sensor;
   a system of fasteners attaching the flexible support to the load, in a position such that the proximity sensors are distributed around the lateral surface;
   at least one display unit configured to display the signals generated by the proximity sensors; and
   a transmission device configured to transmit the signals generated by the proximity sensors to the at least one display unit.

10. A method for moving a load having a closed-contour lateral surface, the method comprising the following steps:
   attaching a plurality of proximity sensors to the load, the proximity sensors being distributed around the lateral surface;
   hooking the load to an equipment for lifting and moving the load;
   lifting the load using the lifting and moving equipment, and moving the load using the lifting and moving equipment from an initial position to a final position with the load suspended from the lifting and moving equipment, each proximity sensor scanning to check whether an obstacle is in the vicinity of said proximity sensor during movement of the load and generating a signal indicating whether an obstacle is in a vicinity of said proximity sensor during movement of the load;

transmitting the signals generated by the proximity sensors to at least one display unit; and displaying said signals on the at least one display unit, wherein the display of said signals on the at least one display unit is performed by displaying on an electronic screen of the at least one display unit a symbol representing the lateral surface of the load and, for each proximity sensor, a graphic element indicating whether an obstacles in the vicinity of said proximity sensor, the graphic element being produced using the signal generated by said proximity sensor, wherein the proximity sensors are attached to a flexible support, the flexible support being arranged around the lateral surface of the load and the flexible support comprises parts of different colors, the graphic elements associated with the proximity sensors located in a part of a given color being of said color.

\* \* \* \* \*